United States Patent
Wang et al.

(10) Patent No.: US 11,390,809 B2
(45) Date of Patent: Jul. 19, 2022

(54) METHOD FOR PREPARING SOIL CONDITIONER

(71) Applicant: SHANGHAI UNIVERSITY OF ENGINEERING SCIENCE, Shanghai (CN)

(72) Inventors: Jincheng Wang, Shanghai (CN); Pinhua Rao, Shanghai (CN); Sihao Chen, Shanghai (CN); Runkai Wang, Shanghai (CN); Xuebin Wang, Shanghai (CN)

(73) Assignee: SHANGHAI UNIVERSITY OF ENGINEERING SCIENCE, Shanghai (CN)

( * ) Notice: Subject to any disclaimer, the term of this patent is extended or adjusted under 35 U.S.C. 154(b) by 330 days.

(21) Appl. No.: 16/650,008

(22) PCT Filed: Mar. 1, 2018

(86) PCT No.: PCT/CN2018/077745
§ 371 (c)(1),
(2) Date: Mar. 24, 2020

(87) PCT Pub. No.: WO2019/062024
PCT Pub. Date: Apr. 4, 2019

(65) Prior Publication Data
US 2020/0270523 A1    Aug. 27, 2020

(30) Foreign Application Priority Data

Sep. 26, 2017 (CN) .......................... 201710881454.8

(51) Int. Cl.
| | | |
|---|---|---|
| *C09K 17/32* | (2006.01) | |
| *C05G 3/40* | (2020.01) | |
| *C05G 3/80* | (2020.01) | |
| *C05G 5/35* | (2020.01) | |
| *C09K 101/00* | (2006.01) | |

(52) U.S. Cl.
CPC .......... *C09K 17/32* (2013.01); *C09K 2101/00* (2013.01)

(58) Field of Classification Search
None
See application file for complete search history.

(56) References Cited

FOREIGN PATENT DOCUMENTS

| CN | 104311253 A | * | 1/2015 | ........... C05G 3/0011 |
|---|---|---|---|---|
| CN | 104311253 A | | 1/2015 | |
| CN | 105524624 A | | 4/2016 | |
| CN | 106118684 A | | 11/2016 | |
| CN | 106588445 A | | 4/2017 | |
| CN | 107652977 A | | 2/2018 | |
| GB | 903959 A | | 8/1962 | |
| WO | 2012022046 A1 | | 2/2012 | |

OTHER PUBLICATIONS

Guilherme et al. "Superabsorbent hydrogels based on polysaccharides for application in agriculture as soil conditioner and nutrient carrier; A review", European Polymer Journal 72 (2015) 365-385 (Year: 2015).*

* cited by examiner

*Primary Examiner* — Charles R Nold
(74) *Attorney, Agent, or Firm* — Ware, Fressola, Maguire & Barber LLP

(57) ABSTRACT

A method for preparing a soil conditioner comprises the following steps: swelling alginates in distilled water to obtain alginate gel; adding chitosan to prepare an alginate/chitosan composite material; reacting with N-isopropylacrylamide, and dissolving the obtained reaction product in water to obtain an aqueous phase; dissolving a soil conditioning material in a solvent to obtain an oil phase; mixing the oil phase with the aqueous phase, and performing stirring reaction and centrifugal separation to prepare the product. Compared with the prior art, the present invention implements conditioning and intelligent controlled release of soil by means of molecular structure design and composition control.

10 Claims, No Drawings

METHOD FOR PREPARING SOIL CONDITIONER

TECHNICAL FIELD

The present invention relates to the field of soil conditioning and, in particular, to a method for preparing a soil conditioner.

BACKGROUND

Greenhouse soil refers collectively to cultivating soil for use in horticultural facilities such as glass, sunlight and plastic greenhouses. By the end of the last century, China has topped the world in terms of greenhouse area. In the "13$^{th}$ Five-Year Plan", "expediting the development of facility agriculture" has been slated as an important strategy for fostering modern agriculture. Agricultural development in Shanghai, the economic center of China, exhibits urban characteristics, such as high utilization and exploitation of farming land and resources, and facility agriculture has become an important part of the metropolis' agricultural industry. However, due to lack of scientific and rational management and of relevant technical measures, sustainable use of greenhouse soil there tends to be short, and after years of frequent cultivation, the soil suffers from a number of issues such as alkalization and imbalance of nutrients and microbial communities, which would lead to frequent diseases and pests and reduced production of crops.

In order to overcome these problems with the soil, many solutions have been proposed, such as the use of soil conditioners. A soil conditioner is a material intended to be added to the soil to improve its physical and chemical properties and biological activity and thus provide therewith effects such as moisture retention, loosening, fertilization and higher air permeability. Although soil conditioner could not replace fertilizers, they can improve soil structure, promote the absorption of nutrients by crops and reduce the amount of used fertilizers, thus increasing the yield of crops. In China, natural soil conditioners, such as gypsum, have been long used in saline soil and proven to have remarkable effects on such soil, such as reducing its pH and conductivity. However, this approach can seldom be used to condition organic substances in soil. Although many synthetic soil conditioners have been adopted in soil improvement practices, such as polyacrylamide (PAM) that can increase rainfall infiltration and mitigate soil erosion, such synthetic polymers rarely degrade in the environment and tend to lead to secondary pollution.

Soil conditioning practices over the past many years have shown that existing soil conditioners can hardly address the requirements of environmental friendliness, intelligent response, controlled release and high efficiency, or meet the future trends in such materials. Alginates are natural macromolecular polysaccharides found in brown algae, and when applied to greenhouse soil, will be naturally degraded into monosaccharides that can be absorbed by crops as carbon sources. In addition to exhibiting desirable non-toxic degradability and biocompatibility as environmentally friendly materials, alginates also have good thickening, film forming and gelling capabilities that are considered particularly advantageous for improving physical and chemical properties of soil.

At present, there are few studies on alginates as soil conditioners, and most research efforts in this area are focusing on biological, medical and other studies. Yang Junxing et al. (Yang Junxing, Wang Qi, Wang Yuanyuan, Han Shu, Yao Jiawei, Shao Siqi, Wang Jinglong, Liu Zhihui, Guo Yupeng. Preparation and in vitro Release of Double-Loaded Multi-Layer Alginate-Chitosan Sustained-Release Microspheres, Chemical Journal of Chinese Universities, 2015, 36: 1025-1032) prepared vascular endothelial growth factor (VEGF)-loaded calcium alginate core-shell microspheres by cross-linking sodium alginate with calcium ions by means of instillation and created a multi-drug loaded sustained-release system using a layer-by-layer self-assembly technique. Zhao Meng et al. (Zhao Meng, Cai Sha, Qu Fangning, Fang Yapeng. Research Progress in Preparation of Alginate Microcapsules by Internal Emulsification, Science and Technology of Food Industry, 2013, 22: 392-396) successfully encapsulated different compositions selected from lactic acid bacteria, DNA, protein and the like by internal emulsification in alginate microcapsules under various experimental conditions. However, in order for these to be used in practice as soil conditioners consistent with the growth of crops, intelligent controlled release of their ingredients for conditioning physical and chemical properties of soil is additionally required from structural design of core-shell microspheres.

Chinese Pat. App. Pub. No. CN106588445A discloses a seaweed microbe-based soil conditioner for special use in saline-alkali land, which is prepared by mixing acidic material(s), plant-derived organic material(s), animal-derived organic material(s), composite probiotics, a seaweed extract obtained by enzymatic hydrolysis and medium and trace elements. However, this soil conditioner is simply a mixture of the various nutrients and thus only allows a simple conditioning mechanism. In contrast, the present invention enables the preparation of a conditioner in the form of core-shell structures capable of releasing a conditioning ingredient loaded therein in a sustained manner. Moreover, the conditioner is a smart conditioner with temperature-, moisture- and pH-sensitive and other properties helpful in additionally improving its conditioning efficacy and efficiency.

SUMMARY OF THE INVENTION

The present invention aims to overcome the above problems with the prior art by presenting a method for preparing a soil conditioner which is structurally designed and composed at the molecular level to allow intelligent controlled release of soil conditioning ingredients.

This object is attained by the following subject matter:

a method for preparing a soil conditioner, comprising the steps of:

(1) obtaining an alginate gel by swelling an alginate in distilled water and raising the temperature to 40-60° C.;

(2) obtaining an alginate/chitosan composite material by adding the alginate gel to chitosan at room temperature, with nitrogen passed therethrough, and raising the temperature to 70-90° C., stirring the mixture for 1-2 h, leaving it for 2-4 h and drying it;

(3) obtaining an alginate/chitosan/poly(N-isopropylacrylamide) (PNIPA) composite material by adding N-isopropyl acrylamide to the alginate/chitosan composite material and stirring the mixture for 30-50 min at 30-40° C. and 1500-2000 rpm;

(4) obtaining an oil phase by dissolving a soil-conditioning material in a solvent;

(5) obtaining an emulsion by adding the oil phase to an aqueous solution of the alginate/chitosan/PNIPA composite material as an aqueous phase at 50-70° C. and emulsifying the mixture at 2000-3000 rpm for 40-60 min; and (6) obtaining the soil conditioner as alginate-based smart composite microspheres appearing as a white solid powder by converting the emulsion into a milky white colloidal solution through continuously stirring the emulsion at 40-60° C. and 400-600 rpm for 1-3 h and removing the solvent therefrom by evaporation, centrifuging the colloidal solution at 12,000-16,000 rpm for 1-3 h, collecting and repeatedly washing the sediment resulting from the centrifugation, and drying the sediment under normal pressure to a constant weight.

In a preferred embodiment, in step (1), the alginate is potassium or calcium alginate, and a ratio by weight of the alginate to the distilled water is (10-20):(100-200).

In a preferred embodiment, in step (2), a ratio by weight of the chitosan to the alginate gel is (10-20):(80-100).

In a preferred embodiment, in step (3), a ratio by weight of the N-isopropyl acrylamide to the alginate/chitosan composite material is (50-70):(150-200).

In a preferred embodiment, in step (4), the soil-conditioning material is humic acid, gypsum or carboxymethyl cellulose and is present in the oil phase at a concentration by weight of 1%-3%, and the solvent is dichloromethane, acetone or ethanol.

In a preferred embodiment, in step (5), the alginate/chitosan/PNIPA composite material is present in the aqueous phase at a concentration by weight of 1%-3%, and a ratio by weight of the oil phase to the aqueous phase is 1:(4-6).

In a preferred embodiment, the chitosan is 85%-95% N-deacetylated and has a viscosity of 1000 mPa/s. An N-deacetylation degree lower than 85%-95% may not allow the chitosan to well condense with the alginate, and may even lead to failure in the formation of the core-shell structures.

In a preferred embodiment, the PNIPA has a number-average molecular weight of 40000-50000. Otherwise, an adverse impact may be imposed on the intelligent controlled release properties.

Compared to the prior art, the alginate used in the present invention offers a wide range of advantages including non-toxicity, non-irritation, excellent biocompatibility, easy degradation, high strength, high plasticity, easy processability and sustained release. The chitosan used in the invention has good biological functionality and compatibility, safety, microbial degradability and other properties, and the active hydroxyl groups and amino groups in its macromolecules impart to it strong chemical reactivity. Additionally, the PNIPA used in the present invention has both hydrophilic amido groups and hydrophobic isopropyl groups in its macromolecular chains, which make both the aqueous solution of the linear PNIPA and the hydrogel of the cross-linked PNIPA temperature-sensitive. Therefore, the composite microcapsules prepared by mixing the alginate that allows sustained release, the chitosan having a certain degree of reactivity and the temperature-sensitive PNIPA are capable of sustained release and environmentally responsive. Accordingly, the so-prepared soil conditioner can improve the physical and chemical properties and hence the quality of the soil to which it is applied and lays a foundation for future potential development of environmentally-friendly "green" polymer soil conditioners. The alginate-based smart conditioner in the form of core-shell structures is temperature-, moisture- and pH-sensitive and can release the load ingredient in a sustained manner, thereby effectively improving the quality and structure of the soil. Further, depending on how the soil is to be fertilized, potassium or calcium alginate may be selected to form the shells to encapsulate desired nutrients such as nitrogenous, potassic, phosphoric and other fertilizers to provide a diversity of effects. When applied to the soil, the soil conditioner can improve its physical and chemical properties and biological activity and thus provide therewith significant effects including moisture retention, loosening, fertilization and higher air permeability.

DETAILED DESCRIPTION OF THE INVENTION

The present invention will be described in greater detail below with reference to particular examples intended to help those of ordinary skill in the art better understand the present invention, without limiting it in any sense. It is to be noted that various variations and modifications may be made by those of ordinary skill in the art without departing from the spirit of the present invention. It is intended that all such variations and modifications fall within the scope of the invention.

Example 1

A potassium alginate gel was prepared by swelling 10 g of potassium or calcium alginate in 100 g of distilled water for 1 h and then raising the temperature to 40° C. In a three-necked flask, 10 g of 85% N-deacetylated chitosan having a viscosity of 1000 mPa/s was added and stirred for 20 min at room temperature, with nitrogen passed therethrough, and 80 g of the potassium alginate gel was added thereto. After heated to 70° C., the mixture was stirred for 1 h, left standing for 2 h, and dried for 30 min in a vacuum oven, resulting in a potassium alginate/chitosan composite material. Subsequently, 50 g of N-isopropyl acrylamide was added to 150 g of the potassium or calcium alginate/chitosan composite material, and the mixture was stirred for 50 min at 30° C. and 1500 rpm to produce a potassium alginate/chitosan/poly(N-isopropylacrylamide) (PNIPA) composite material. The PNIPA had a number-average molecular weight of 40000. Humic acid was added to dichloromethane at a concentration by weight of 1% to create an oil phase which was then added at 50° C. to an aqueous solution of the alginate/chitosan/PNIPA composite material serving as an aqueous phase. Wherein, the alginate/chitosan/PNIPA composite material was present in the aqueous solution at a concentration by weight of 1%, and the oil phase was added to the aqueous phase at a ratio by weight of 1:4. The mixture was then stirred and thereby emulsified at 2000 rpm for 60 min to produce an emulsion which was subsequently converted into a milky white colloidal solution by continuously stirring the emulsion for 3 h at 40° C. and 400 rpm and removing the solvent by evaporation. The colloidal solution was centrifuged at 12,000 rpm for 3 h, and the sediment was collected, washed for several times with distilled water and dried to a constant weight at normal pressure, obtaining a soil conditioner consistent with the present invention as alginate-based smart composite microspheres that appeared as a white solid powder.

Tables 1 and 2 summarize the IR spectroscopic characteristics, particle size, thermal stability and intelligent controlled-release characteristics of the alginate-based smart composite microspheres prepared in this Example.

Example 2

A potassium alginate gel was prepared by swelling 15 g of potassium alginate in 150 g of distilled water for 2 h and then raising the temperature to 50° C. In a three-necked flask, 15 g of 90% N-deacetylated chitosan having a viscosity of 1000 mPa/s was added and stirred for 25 min at room temperature, with nitrogen passed therethrough, and 90 g of the potassium alginate gel was added thereto. After heated to 80° C., the mixture was stirred for 1.5 h, left standing for 3 h, and dried for 40 min in a vacuum oven, resulting in a potassium alginate/chitosan composite material. After that, 60 g of N-isopropyl acrylamide was added to 180 g of the potassium alginate/chitosan composite material, and the mixture was stirred for 40 min at 35° C. and 1800 rpm to produce a potassium alginate/chitosan/PNIPA composite material. The PNIPA had a number-average molecular weight of 45000. Gypsum was added to acetone at a concentration by weight of 2% to create an oil phase which was then added at 60° C. to an aqueous solution of the alginate/chitosan/PNIPA composite material serving as an aqueous phase. Wherein, the alginate/chitosan/PNIPA composite material was present in the aqueous solution at a concentration by weight of 2%, and the oil phase was added to the aqueous phase at a ratio by weight of 1:5. The mixture was then stirred and thereby emulsified at 2500 rpm for 50 min to produce an emulsion which was subsequently converted into a milky white colloidal solution by continuously stirring it for 2 h at 50° C. and 500 rpm and removing the solvent by evaporation. The colloidal solution was centrifuged at 14,000 rpm for 2 h, and the sediment was collected, washed for several times with distilled water and dried to a constant weight at normal pressure, obtaining a soil conditioner consistent with the present invention as alginate-based smart composite microspheres that appeared as a white solid powder.

Tables 1 and 2 summarize the IR spectroscopic characteristics, particle size, thermal stability and intelligent controlled-release characteristics of the alginate-based smart composite microspheres prepared in this Example.

Example 3

A potassium or calcium alginate gel was prepared by swelling 20 g of calcium alginate in 200 g of distilled water for 3 h and then raising the temperature to 60° C. In a three-necked flask, 20 g of 90% N-deacetylated chitosan having a viscosity of 1000 mPa/s was added and stirred for 30 min at room temperature, with nitrogen passed therethrough, and 100 g of the calcium alginate gel was added thereto. After heated to 70° C., the mixture was stirred for 2 h, left standing for 4 h, and dried for 50 min in a vacuum oven, resulting in a calcium alginate/chitosan composite material. Afterward, 70 g of N-isopropyl acrylamide was added to 200 g of the potassium or calcium alginate/chitosan composite material, and the mixture was stirred for 30 min at 40° C. and 2000 rpm to produce a calcium alginate/chitosan/PNIPA composite material. The PNIPA had a number-average molecular weight of 42000. Carboxymethyl cellulose was added to ethanol at a concentration by weight of 3% to create an oil phase which was then added at 70° C. to an aqueous solution of the alginate/chitosan/PNIPA composite material serving as an aqueous phase. Wherein, the alginate/chitosan/PNIPA composite material was present in the aqueous solution at a concentration by weight of 3%, and the oil phase was added to the aqueous phase at a ratio by weight of 1:6. The mixture was then stirred and thereby emulsified at 3000 rpm for 40 min to produce an emulsion which was subsequently converted into a milky white colloidal solution by continuously stirring it for 1 h at 60° C. and 600 rpm and removing the solvent by evaporation. The colloidal solution was centrifuged at 16,000 rpm for 1 h, and the sediment was collected, washed for several times with distilled water and dried to a constant weight at normal pressure, obtaining a soil conditioner consistent with the present invention as alginate-based smart composite microspheres that appeared as a white solid powder.

Tables 1 and 2 summarize the IR spectroscopic characteristics, particle size, thermal stability and intelligent controlled-release characteristics of the alginate-based smart composite microspheres prepared in this Example.

TABLE 1

IR spectroscopic characteristics, 50% weight loss temperature and particle size ranges of the prepared alginate-based smart composite microspheres

|  | Example 1 | Example 2 | Example 3 |
| --- | --- | --- | --- |
| Wavenumber/cm$^{-1}$ | 2800-3000 | 2800-3000 | 2800-3000 |
| Wavenumber/cm$^{-1}$ | 3300-3600 | 3350-3550 | 3400-3650 |
| 50% Weight Loss Temperature/° C. | 450-550 | 470-580 | 490-590 |
| Particle Size Range/μm | 10-20 | 20-30 | 30-40 |

TABLE 2

Intelligent controlled-release characteristics of the alginate-based smart composite microspheres

| Example | 0° C. | 5° C. | 15° C. | 25° C. | 35° C. |
| --- | --- | --- | --- | --- | --- |
| 1 | 0 | 2% | 15% | 35% | 60% |
| 2 | 0 | 4% | 20% | 40% | 70% |
| 3 | 0 | 6% | 25% | 45% | 80% |

Example 4

A method for preparing a soil conditioner includes the steps of:

(1) obtaining an alginate gel by swelling 10 g of potassium alginate in 200 g of distilled water for 1 h and raising the temperature to 40° C.;

(2) obtaining an alginate/chitosan composite material by adding 10 g of 95% N-deacetylated chitosan having a viscosity of 1000 mPa/s to a three-necked flask, stirring the chitosan for 20 min at room temperature, with nitrogen passed therethrough, adding 80 g of the alginate gel thereto, heating the mixture to 70° C., stirring it for 1 h, leaving it standing for 2 h and drying it for 30 min in a vacuum oven;

(3) adding 50 g of N-isopropyl acrylamide to 150 g of the alginate/chitosan composite material, stirring the mixture for 30 min at 40° C. and 1500 rpm to produce an alginate/chitosan/PNIPA composite material, wherein PNIPA has a number-average molecular weight of 50000;

(4) obtaining an oil phase by dissolving humic acid as a soil-conditioning material in dichloromethane as a solvent, wherein the soil-conditioning material is present at a concentration by weight of 1% in the oil phase;

(5) adding the oil phase to an aqueous solution of the alginate/chitosan/PNIPA composite material as an aqueous phase at 50° C. and emulsifying the mixture at 2000 rpm for 40 min to produce an emulsion, wherein the alginate/chitosan/PNIPA composite material is present in the aqueous solution at a concentration by weight of 1%, and the oil phase is added to the aqueous phase at a ratio by weight of 1:4; and (6) obtaining a milky white colloidal solution by continuously stirring the emulsion for 1 h at 40° C. and 400 rpm and removing the solvent by evaporation, centrifuging the colloidal solution at 12,000 rpm for 1 h, collecting the sediment resulting from the centrifugation, washing it for several times with distilled water and drying it to a constant weight at normal pressure, thereby obtaining the soil conditioner as alginate-based smart composite microspheres appearing as a white solid powder.

Example 5

A method for preparing a soil conditioner includes the steps of:

(1) obtaining an alginate gel by swelling 20 g of calcium alginate in 100 g of distilled water for 3 h and raising the temperature to 60° C.;

(2) obtaining an alginate/chitosan composite material by adding 20 g of 92% N-deacetylated chitosan having a viscosity of 1000 mPa/s to a three-necked flask, stirring the chitosan for 30 min at room temperature, with nitrogen passed therethrough, adding 100 g of the alginate gel thereto, heating the mixture to 90° C., stirring it for 2 h, leaving it standing for 4 h and drying it for 50 min in a vacuum oven;

(3) adding 70 g of N-isopropyl acrylamide to 200 g of the alginate/chitosan composite material, stirring the mixture for 50 min at 40° C. and 2000 rpm to produce an alginate/chitosan/PNIPA composite material, wherein PNIPA has a number-average molecular weight of 48000;

(4) obtaining an oil phase by dissolving gypsum as a soil-conditioning material in acetone as a solvent, wherein the soil-conditioning material is present at a concentration by weight of 3% in the oil phase;

(5) adding the oil phase to an aqueous solution of the alginate/chitosan/PNIPA composite material as an aqueous phase at 70° C. and emulsifying the mixture at 3000 rpm for 60 min to produce an emulsion, wherein the alginate/chitosan/PNIPA composite material is present in the aqueous solution at a concentration by weight of 3%, and the oil phase is added to the aqueous phase at a ratio by weight of 1:6; and (6) obtaining a milky white colloidal solution by continuously stirring the emulsion for 3 h at 60° C. and 600 rpm and removing the solvent by evaporation, centrifuging the colloidal solution at 16,000 rpm for 3 h, collecting the sediment resulting from the centrifugation, washing it for several times with distilled water and drying it to a constant weight at normal pressure, thereby obtaining the soil conditioner as alginate-based smart composite microspheres appearing as a white solid powder.

It is to be understood that the present invention is not limited to the foregoing particular examples and various modifications and changes may be made by those skilled in the art within the scope of the appended claims without affecting the essence of the invention.

What is claimed is:

1. A method for preparing a soil conditioner, comprising the steps of:

(1) obtaining an alginate gel by swelling an alginate in distilled water and raising the temperature to 40-60° C.;

(2) obtaining an alginate/chitosan composite material by adding the alginate gel to chitosan at room temperature, with nitrogen passed therethrough, and raising the temperature to 70-90° C., stirring the mixture for 1-2 h, leaving it for 2-4 h and drying it;

(3) obtaining an alginate/chitosan/poly(N-isopropylacrylamide) (PNIPA) composite material by adding N-isopropyl acrylamide to the alginate/chitosan composite material and stirring the mixture for 30-50 min at 30-40° C. and 1500-2000 rpm;

(4) obtaining an oil phase by dissolving a soil-conditioning material in a solvent;

(5) obtaining an emulsion by adding the oil phase to an aqueous solution of the alginate/chitosan/PNIPA composite material as an aqueous phase at 50-70° C. and emulsifying the mixture at 2000-3000 rpm for 40-60 min; and (6) obtaining the soil conditioner as alginate-based composite microspheres appearing as a white solid powder by converting the emulsion into a milky white colloidal solution through continuously stirring the emulsion at 40-60° C. and 400-600 rpm for 1-3 h and removing the solvent therefrom by evaporation, centrifuging the colloidal solution at 12,000-16,000 rpm for 1-3 h, collecting and repeatedly washing the sediment resulting from the centrifugation, and drying the sediment under normal pressure to a constant weight.

2. The method of claim 1, wherein the alginate in step (1) is potassium or calcium alginate.

3. The method of claim 1, wherein the ratio by weight of the alginate to the distilled water in step (1) is (10-20):(100-200).

4. The method of claim 1, wherein the ratio by weight of the chitosan to the alginate gel in step (2) is (10-20):(80-100).

5. The method of claim 1, wherein the ratio by weight of the N-isopropyl acrylamide to the alginate/chitosan composite material in step (3) is (50-70):(150-200).

6. The method of claim 1, wherein the soil-conditioning material in step (4) is humic acid, gypsum or carboxymethyl cellulose and the solvent is dichloromethane, acetone or ethanol.

7. The method of claim 1, wherein the soil-conditioning material in step (4) is present in the oil phase at a concentration by weight of 1%-3%.

8. The method of claim 1, wherein the alginate/chitosan/PNIPA composite material in step (5) is present in the aqueous phase at a concentration by weight of 1%-3%.

9. The method of claim 1, wherein the ratio by weight of the oil phase to the aqueous phase in step (5) is 1:(4-6).

10. The method of claim 1, wherein the chitosan is 85%-95% N-deacetylated and has a viscosity of 1000 mPa/s; and the PNIPA has a number-average molecular weight of 40000-50000.

* * * * *